United States Patent [19]

Nagata et al.

[11] Patent Number: 5,027,245

[45] Date of Patent: Jun. 25, 1991

[54] MAGNETIC HEAD FOR MULTI-TRACK RECORDING HAVING READ AND WRITE TRANSDUCERS FORMED BY THIN-FILM TECHNOLOGY

[75] Inventors: Yuji Nagata, Osaka; Toshio Fukazawa, Kyoto; Kumiko Wada, Kawanishi; Yoshihiro Tosaki, Osaka, all of Japan

[73] Assignee: Matsushita Electric Industrial Co., Ltd., Osaka, Japan

[21] Appl. No.: 569,221

[22] Filed: Aug. 15, 1990

Related U.S. Application Data

[63] Continuation-in-part of Ser. No. 236,813, Aug. 26, 1988, abandoned.

[30] Foreign Application Priority Data

Aug. 27, 1987 [JP] Japan .................. 62-214579

[51] Int. Cl.$^5$ ........................ G11B 5/29; G11B 5/48
[52] U.S. Cl. .................................. 360/121; 360/122
[58] Field of Search .................. 360/121, 119, 122

[56] References Cited

U.S. PATENT DOCUMENTS 3,978,523  8/1976  Tanaka et al. .................. 360/121
4,685,005  8/1987  Fields, Jr. ........................ 360/121

FOREIGN PATENT DOCUMENTS 56-83830  7/1981  Japan .................. 360/121
60-50710  3/1985  Japan .................. 360/121

OTHER PUBLICATIONS

"Variable Track Density Magnetic Head," IBM TDB, vol. 28, No. 2, Jul. 1985, p. 558.
"Design and Performance of a Magnetic Head for a High-Density Tape Drive" by D. M. Cannon et al.; IBM J. Res. Develop, vol. 30, No. 3, May 1986, pp. 270-277.

Primary Examiner—John H. Wolff
Attorney, Agent, or Firm—Pollock, Vande Sande & Priddy

[57] ABSTRACT

A magnetic head for multi-track data recording on magnetic tape is formed of a combination of two head modules, each having a linear array of thin-film transducer elements formed on a substrate, each of these arrays consisting of a mixture of write elements and read elements. These are positioned on the respective head modules such that when the head modules are combined with the substrates mutually opposing, pairs of transducer elements are formed for respective tape tracks, each pair consisting of a read and a write element. "Read-after-write" recording confirmation can thereby be implemented together with bidirectional recording operation, by using only a combination of two head modules.

8 Claims, 4 Drawing Sheets

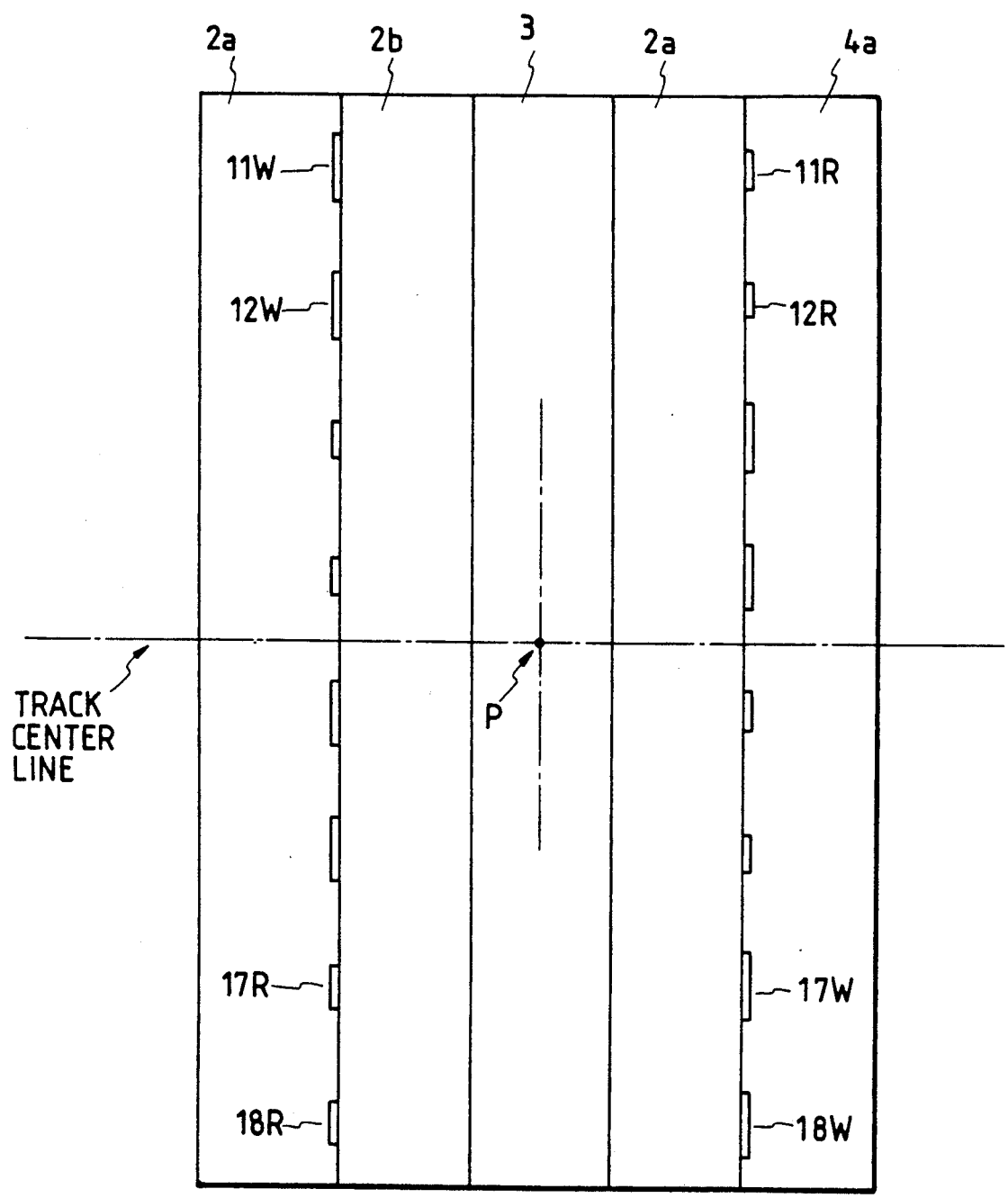

MAGNETIC HEAD FOR MULTI-TRACK RECORDING HAVING READ AND WRITE TRANSDUCERS FORMED BY THIN-FILM TECHNOLOGY

This application is a continuation-in-part of Ser. No. 236,813, filed on Aug. 26, 1988, now abandoned.

BACKGROUND OF THE INVENTION

The present invention relates to a magnetic head for multi-track magnetic recording operation, having arrays of read and write transducer elements formed by thin-film photolithography technology.

In recent years, there has arisen an increasing demand for increased speed of data transfer to and from various types of magnetic recording apparatus, particularly in the case of high-density tape recording apparatus. For this reason, multi-track recording has been adopted whereby a substantial number of read and write transducer elements for respective recording tracks are used to configure a magnetic head. Due to the extremely small spacings between the read and write transducer elements of respective tracks, and the extremely small sizes of the transducer elements themselves, it has become uneconomical to employ conventional manufacturing techniques to form the individual transducer elements (e.g. by winding individual coils for each transducer element, using wire) and hence thin-film techniques have been adopted to manufacture such a magnetic head. With such a method, a large number of thin-film transducer elements can be formed on a substrate formed of a magnetic material such as ferrite, using photolithography techniques. It is necessary to utilize respectively different configurations for the read and the write elements of such a magnetic head.

With such a thin-film magnetic head, each of the write transducer elements is manufactured by forming a thin-film coil upon a substrate consisting of a suitable magnetic material, which functions as respective magnetic cores for these transducer elements. Another magnetic substrate may be placed directly over this thin-film coil, to function as upper magnetic cores for the transducer elements. Alternatively, a film of electrically insulating material may be formed over the thin-film coil, and a thin film of a metallic magnetic material is then formed over this insulating film, to constitute the upper magnetic cores.

A magnetoresistive element (formed from a metallic magnetic thin film which exhibits magnetoresistive properties) is used to constitute each of the read transducer elements of such a thin-film magnetic head. Such a read element is typically manufactured by first forming a thin electrically insulating film upon a substrate of magnetic material, then forming a permalloy thin-film (which exhibits magnetoresistive properties) over this insulating film, to a thickness of typically 500 angstroms. An electrically insulating thin film is then formed over the permalloy film, and finally a substrate formed of magnetic material is placed in contact with the latter insulating film In some cases, an electrically conductive layer is formed below the aforementioned permalloy film, for use in producing a biasing magnetic field. This is done in order to increase the linearity of read signal generation by such a read transducer element.

A prior art example of such a thin-film magnetic head, for use in a multi-track magnetic tape recording apparatus, has been described in I.B.M. J. Res. Develop. Vol. 30, No. 3, pages 270 to 276. As described in that article, thin-film write transducer elements are formed on one substrate, while thin-film read transducer elements are formed on another substrate, to form respective thin-film read and write heads, i.e. respective modules one of which is formed only with read elements and the other formed only with write elements. These modules are combined to form the final magnetic head. However with one method of data recording utilized for such multi-track tape recorders, called "read-after-write" operation, data written on each tape track are read out immediately after being written, in order to check for write errors. In addition, a capability for bi-directional operation of such a tape recording apparatus is desirable, i.e. it should be possible to execute writing of data both when the tape is moving in a forward direction and when the tape is moving in the reverse direction. This is not possible by using a combination of a thin-film read magnetic head and a thin-film write magnetic head according to the prior art of the type described in the aforementioned I.B.M. article, since data writing will be only possible for one direction of tape movement, if "read-after-write" operation is to be executed. In order to implement such "read-after-write" operation with thin-film head modules of the type described, it would be necessary to use a combination of three such modules, i.e. a combination of a write head, a read head and a write head successively arranged in that order, such that each tape track moves past a write thin-film transducer element, a read transducer element, and a write transducer element, for each direction of movement of the tape. Alternatively, a combination of a read head, a write head and a read head successively arranged in that order could be utilized. However if either of these arrangements is used, it becomes difficult to ensure that the tape will be maintained in stable contact with each of the three thin-film head modules. Thus, such a prior art magnetic head has the disadvantage that stable recording and playback operation is difficult to achieve.

SUMMARY OF THE INVENTION

It is an objective of the present invention to overcome the problems of the prior art described above, by providing a magnetic head having integrally formed read and write transducer elements, whereby the aforementioned "read-after-write" function can be implemented together with a bidirectional recording capability, and moreover whereby the establishing of electrical connections to the magentic head from external circuits can be simplified by reduction of the total number of connecting leads required, and furthermore whereby the level of crosstalk is made inherently low, with the magnetic head being formed as a combination of only two modules, referred to in the following as head modules. A magnetic head according to the present invention consists of a combination of two such head modules, each having a linear array of read and write transducer elements formed on a common magnetic substrate by thin-film technology, with the read elements employing respective magnetoresistive elements. Each of the head modules has elements thereof arranged as alternating groups of mutually adjacent thin-film write transducer elements and thin-film read transducer elements, each group containing a fixed number (equal to 2 or greater) of elements.

More specifically, a magnetic head according to the present invention for writing and reading data on and from respective tracks of a recording medium comprises a combination of first and second head modules, each of the head modules comprising a plurality of thin-film read transducer elements and a plurality of thin-film write transducer elements arranged in a linear array, in which a number N of read transducer elements of the first head module care positioned in a condition of rotational symmetry with respect to N write transducer elements of the second head module, where N is an integer of value greater than one, and N write transducer elements of the first head module are positioned in the condition of rotational symmetry with respect to N read transducer elements of the second head module, with read and write transducer element pairs each comprising elements of the first and second head modules being respectively aligned with corresponding ones of the tracks. As a result, and write transducer element pairs are respectively arranged such that for part of these pairs, the corresponding recording tracks will move past each pair in the sequence write element—read element during movement of the recording medium in one, while for the remainder of these pairs, the corresponding recording tracks will move past each pair in the sequence write element—read element during movement of the recording medium in the opposite direction.

In this way, a "read-after-write" capability is provided in a very simple manner, by a magnetic head consisting of combination of two mutually identical head modules.

Moreover, if each of the aforementioned sets of elements which are arranged in a relationship of rotational symmetry has a relatively large number of write or read elements (e.g. 4 or more), then it becomes possible to arranged that for each of the sets of elements, a part (e.g. half) of the total number of terminals of each set (for connecting to external circuits) being formed in a common plane and being mutually connected to form a single common terminal. In this way, the number of lead-out lines that must be connected to the magentic head from external circuits can be very substantially reduced, by comparison with the prior art.

In addition, the invention makes it possible to substantially reduce the total number of deciated erase heads used in combination with a such a magnetic head. That is to say, one erase head can be used in common for one set of mutually adjacent thin-film write transducer elements, for simultaneously erasing all of a set of data that have been written by that set of elements.

BRIEF DESCRIPTION OF THE DRAWINGS

FIG. 5 is a simplified frontal view of a magnetic head according to the present invention for illustrating a track center position.

DESCRIPTION OF PREFERRED EMBODIMENTS

Figure 1:
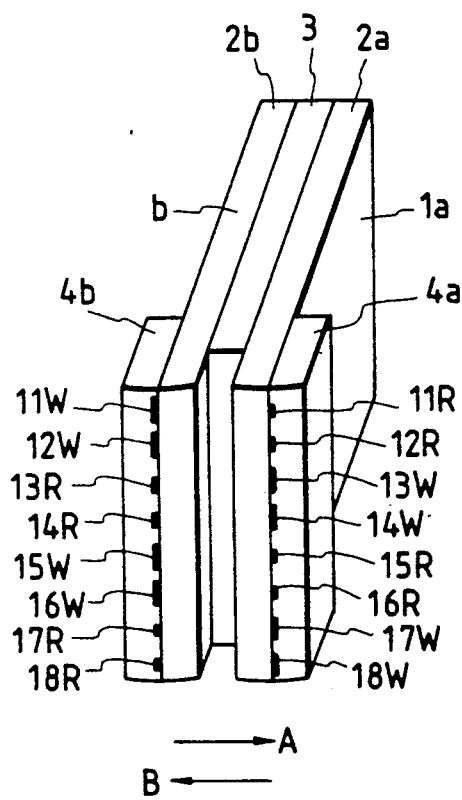
FIG. 1 is an oblique view of a first embodiment of a magnetic head according to the present invention, having integrally formed thin-film read and write transducer elements.

FIG. 1 shows a preferred embodiment of a magnetic head according to the present invention, for use in a multi-track high-density tape recording apparatus. To avoid confusion in the following, the overall magnetic head assembly, designated by reference numeral 10 in FIG. 1, will be referred to as simply the "magnetic head", while each of two sub-units having respective arrays of thin-film read and write transducer elements 11R, 12W,... etc. will be designated as respective head modules These two head modules are designated as 1a and 1b respectively, and each is provided with a linear array of thin-film transducer elements which include both write elements (designated as 11W, 12W, ... and 13W, 14W,...) and read elements (designated as 12R, 14R,... and 11R, 12R,...). These head modules 1a and 1b are formed of respective magnetic substrates 2a and 2b having the aforementioned thin-film transducer elements formed thereon, with the substrates 2a, 2b being respectively attached, mutually opposing, on opposite sides of a common attachment base 3.

A track center position is defined as a point which is positioned on a track center line (i.e. which is a median line of the aforementioned 8 tracks) and also is positioned centrally between the two linear arrays of transducers of the head modules 1a, 1b. The track center position for the embodiment of FIG. 1 is illustrated in FIG. 5, indicated as the point P. The various transducer elements are substantially entirely positioned within a common plane (i.e. which is parallel to a recording surface of a recording medium). It can be understood that each pair of mutually adjacent read transducer elements, e.g. 11R, 12R of one of the pair of head modules 1a, 2a has a corresponding pair of read transducer elements, e.g. 18R, 17R of the other head module, and that each of these pairs is displaced form the other by an amount of rotation of 180° about a central axis passing through the track center position P and perpendicular to the aforementioned common plane. Such a relationship between two sets of transducer elements of respective head modules will be referred to in the following as a condition of rotational symmetry with respect to the track center line.

This embodiment provides 8-track recording. As shown, pairs of mutually adjacent read and write transducer elements occur alternately along each of the head modules la and 1b, alternating at successive pair of recording track positions of a magnetic recording medium (not shown in the drawings). These transducer elements are arranged such that respective pairs of write and read transducer elements are provided in correspondence with respective tracks, e.g. the write transducer element and read transducer element pair 11W, 11R, for a first track, the write transducer element and read transducer element pair 12W, 12R for a second track, the read transducer element and write transducer element pair 13R, 13W for the third track, the rad transducer element and write transducer element pair 14R, 14W for the fourth track, and so on. When the magnetic tape is running in a direction which will be designated in the following as the forward direction, indicated by arrow A in FIG. 1, the aforementioned "read-after-write" function is implemented by recording on odd-numbered tracks (designating the track corresponding to element pair 11R, 11W as the first track). When the tape runs in the reverse direction, i.e. direction B, such "read-after-write" recording can be executed for the even-numbered tracks.

The transducer element array of head module 1a formed on the common magnetic substrate 2a is covered by a protective substrate 4a. Similarly, the transducer element array of head module 1b formed on the common magnetic substrate 2b is covered by a protective substrate 4b.

Figure 2:
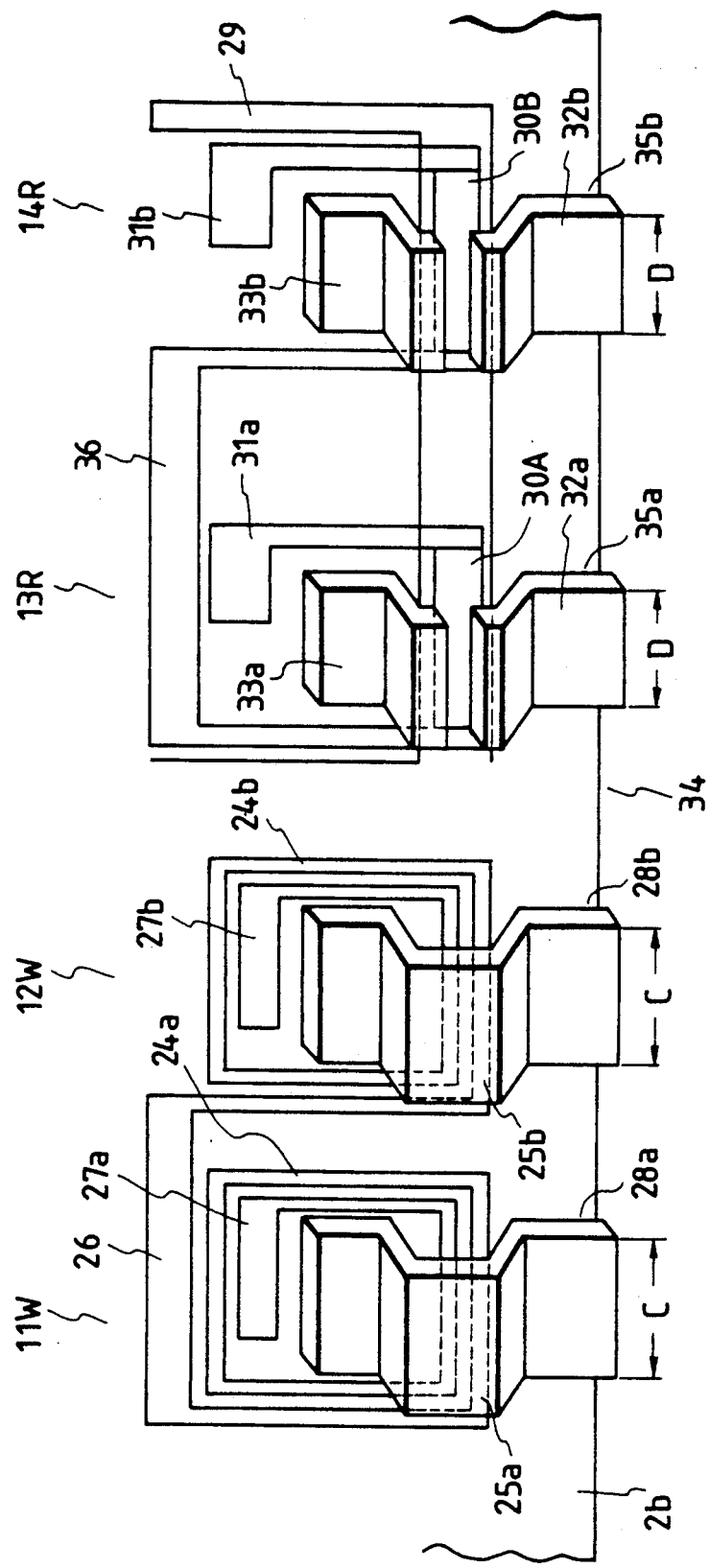
FIG. 2 is a partial expanded oblique view showing a pair of mutually adjacent read transducer elements and a pair of mutually adjacent write transducer elements of a head module in the embodiment of FIG. 1.

FIG. 2 is a partial oblique expanded view of the embodiment of FIG. 1, showing details of two write and read transducer element pairs 11W, 12W, 13R, 14R disposed mutually adjacent on the head module 1b. The write transducer element 11W is formed as a thin film element upon substrate 2b) formed of a magnetic material which is electrically insulating. The element 11W is formed of, in succession, a thin-film coil 24a deposited on the substrate 2b, an upper magnetic core 25a a terminating pad 27a for providing connection to an ternal drive circuit and a common terminating pad 26 for providing connection to the dive circuit and also to a similar thin-film coil 24b of the adjacent write element 12W, which includes a terminating pad 27b for connection to the aforementioned drive circuit. As shown, a central portion of the upper magnetic core 25a or 24b, formed on the magnetic substrate 2a (or 2b) within a central region of the thin-film coil 24a or 24b, an intermediate portion of the core 25a or 26b passes above the thin-film coil 24a or 24b and an outer portion of the core 25a or 26b is positioned outside the coil 24a or 24b and extends towards a front face of the head module.

During operation of such a thin-film write transducer element, a recording current whose value is determined in accordance with data to be written on the, tape is passed through the thin-film coil 24a or 24b, between the terminating pads 26, 27. A signal magnetic flux which is produced by excitation produced by this recording current passes through a magnetic circuit formed of the magnetic substrate 2a (or 2b) and the upper magnetic core 25a or 26b, and emerges to the exterior through a gap 28a or 28b which is formed between the outer most portion of the upper magnetic core 25a or 26b and the magnetic substrate 2b at the front face 34 of the head module. Data are thereby written on two mutually adjacent racks of the tape by the recording magnetic fields thus generated. It can thus be understood that the width C of the thin-film upper magnetic core 25a or 26b at the front face 34 of the head module will determine the write track width.

The pair of thin-film read transducer elements 13R, 14R are formed of a common bias conducting layer portion 29k magnetoresistive elements 30a, 30b, conducting thin-film portions 31a, 31b which include terminating pads of the thin-film read transducer elements 13R, 14R, respectively, and are respectively electrically connected to the magnetoresistive elements 30a, 30b, and a thin-film portion 36 which is formed as a common terminating pad for the pair of thin-film read transducer elements 13R, 14R, front yokes 32a, 32b each formed of magnetic thin-film, and back yokes 33a, 33b. Gaps 35a, 35b are respectively formed between the front yokes 32a, 32b and the magnetic substrate 2b.

During a read operation, a signal magnetic flux which passes into the front yoke 32a or 32b is converted to a change in electrical resistance of the corresponding one of the magnetoresistive element. This produces a corresponding change in a current which is passed through the second electrically conductive thin film portion 31a or 31b, so that the signal magnetic flux can be converted to a corresponding voltage change, and the data can be read. The read track width is determined by the width D of the front yoke 32a or 32b. The value of this read track width D is made less than that of the write track width C, in order to ensure a stable output signal level from the read transducer elements irrespective of slight track positional deviations.

With this embodiment, as shown in FIG. 1, each of the head modules 1a, 1b which are combined to form the magnetic head has an exactly identical array of write and read transducer elements, i.e. consisting of alternating pairs of mutually adjacent thin-film read transducer elements and thin-film write transducer elements which alternate for successive pairs of track positions. Each of these head modules can therefore be produced in exactly the same way, with an identical thin-film deposition pattern, so that manufacturing is simplified. Two of these head modules are then mounted directly mutually opposing upon respective sides of the common base 3 to configure the magnetic head. Such an arrangement serves to reduce the level of crosstalk which occurs in the magnetic head, due to the magnetic shielding which is provided by the magnetic substrates 2a, 2b.

Generally speaking, it is necessary to separate the respective terminals of the thin-film read transducers elements from those of the thin-film write transducer elements in order to prevent excessive noise from being produced. With the preferred embodiment described above, in which the transducer elements of each head module are formed in groups with each group containing transducer elements of identical type, i.e. read or write transducers, it becomes possible to utilize, for each of these groups, a terminal (for connection to an external circuit) which is common to all of the elements of that group. This is exemplified by the common terminal pads 26 and 36 of FIG. 2. Alternaively stated, the invention enables a part of the terminals of the transducer elements to be formed in a common plane, and so to be integrated into a common terminal within that plane. Such an arrangement thereby facilitates the establishing of electrical connections to external circuits, by reducing the number of connecting leads that must be led out from the magnetic head. In addition, the lead-out lines can be more widely mutually separated than has been possible in the prior art, thereby reducing noise and crosstalk.

Figure 3:
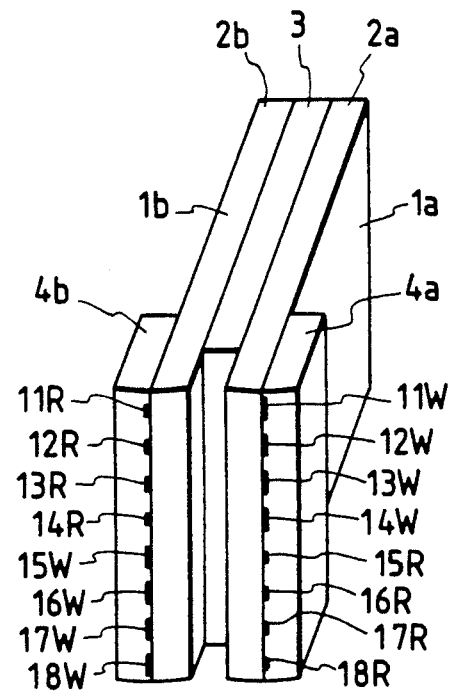
FIG. 3 is an oblique view of a second embodiment of a magnetic head according to the present invention.

The invention has been described in the above with reference to a preferred embodiment. However, various modifications, which fall within the scope claimed for the invention, to this embodiment may be envisaged. FIG. 3 shows a second embodiment, in which, as in the first embodiment, each of two head modules is formed with equal numbers of thin-film write and read transducer elements. However, in the embodiment of FIG. 3, in each of the head modules 1a, 1b, four read transducer elements are positioned on one side of the track center position while four write transducer elements are positioned at the opposite side of that central position, such tat for each of the head modules the write and read element positions of that module correspond to rotation of the positions of respective read and write elements of the other array through 180° about the track center position. Thus, the condition of rotational symmetry about the track center position described for the first embodiment is also true of the second embodiment. As in the case of the first embodiment, the two head modules 1a and 1b are of mutually identical configuration, and are mutually opposing disposed. As a result, each write element of one head module becomes positioned directly opposite a read element of the other head module, while each read element of one head module becomes positioned directly opposite a write element of the other head module. It will be apparent that this embodiment, like the first embodiment, also enables a "read-after-write" function with bidirectional recording to be implemented.

Figure 4:
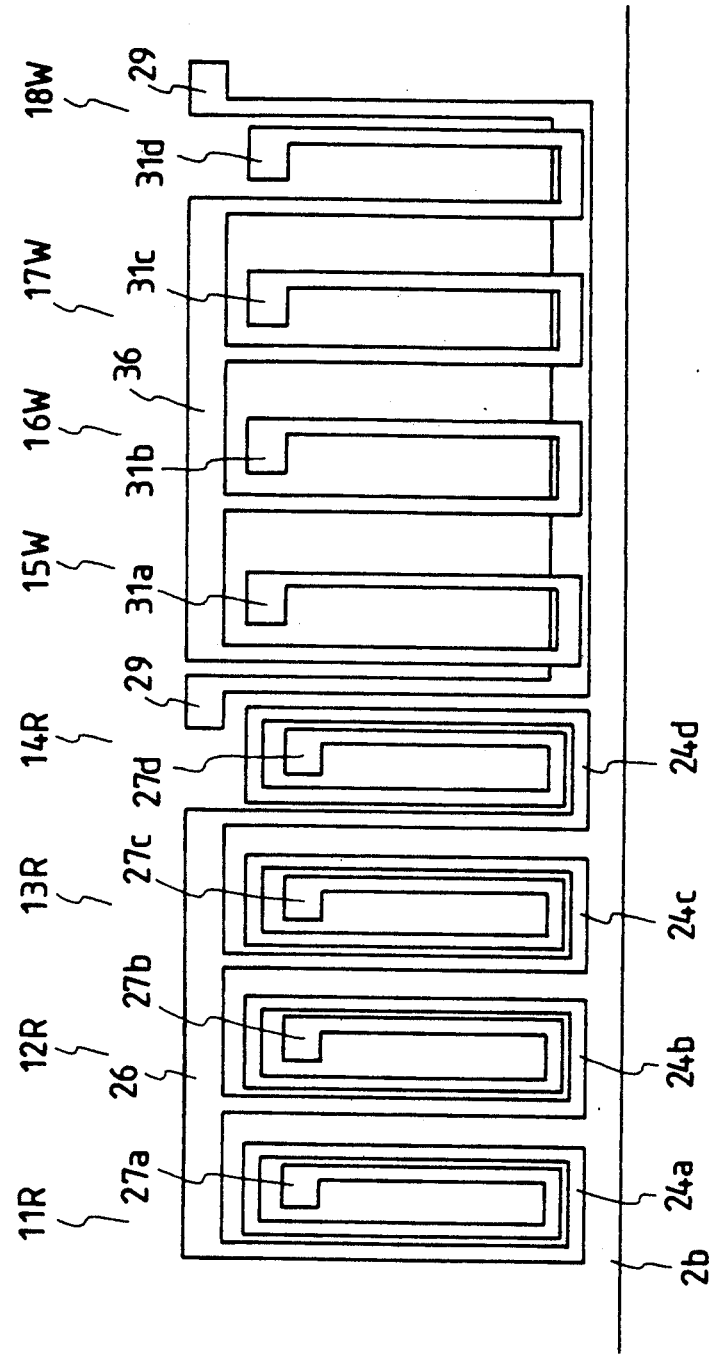
FIG. 4 is a partial expanded plan view showing a thin-film connecting lead and terminal pattern of a head module in the magnetic head of FIG. 3.

The embodiment of FIG. 3 further facilitates the provision of lead-out lines for the magnetic head, as will be described with reference to FIG. 4, which shows the pattern of thin-film electrodes of the head module 1b of this embodiment. As shown, a common terminal pad 26 is formed for the four thin-film read transducer elements 11R to 14R, and a common terminal pad 26 for the four thin-film write transducer elements 15W to 18W. It can thus be understood that this embodiment enables the number of connecting leads that are required to be coupled to the magnetic head for driving the write transducer elements or extracting output signals for the read transducer elements to be very substantially reduced by comparison with the prior art, and enables these leads to be more widely mutually separated.

Generally speaking, data erasure is executed by a plurality of dedicated erase heads for respective tracks of the recording medium.

This embodiment provides the advantage that erasure can be executed by erase heads each of which is common to a plurality of tracks. That is, one erase head can be provided in common for the set of write transducer elements 11W to 14W, and another erase head provided in common for the set of write transducer elements 15W to 18W. In this way, a set of data that has been written by one group of write transducers can be erased simultaneously by a single erase head. This enables further simplification of a magnetic recording apparatus which incorporates a magnetic head according to the present invention. Furthermore, since the head modules 1a and 1b are of mutually identical configuration, the number of components which must be stocked during manufacture can be reduced. This is also true of the first embodiment described above.

What is claimed is:

1. A magnetic head for writing and reading data on and from respective tracks of a recording medium, comprising a combination of first and second head modules, each of said head modules comprising a plurality of thin-film read transducer elements and a plurality of thin-film write transducer elements arranged in a linear array, in which a number N of read transducer elements of said first head module are positioned in a condition of rotational symmetry with respect to N write transducer elements of said second head module, where N is an integer of value greater than one, and N write transducer elements of said first head module are positioned in said condition of rotational symmetry with respect to N read transducer elements of said second head module, with read and write transducer element pairs each comprising elements of said first and second head modules being respectively aligned with corresponding ones of said tracks 2. A magnetic had according to claim 1, in which each of said first and second head modules comprises a substrate having said transducer elements formed thereon, and in which the substrates of said first and second head modules are positioned in a mutually opposing relationship.

3. A magnetic head according to claim 2, in which each of said write transducer elements comprises a magnetic yoke having a width dimension which defines a write track width of said recording medium, and in which a tread track width which is scanned by each said read transducer element is made smaller than said write track width.

4. A magnetic head according to claim 1 in which said first a nd second head modules are mutually identical.

5. A magnetic head according to claim 1, in which each of said write transducer elements comprises a magnetic yoke having a width dimension which defines write track width of said recording medium, and in which a read track width which is scanned by each said read transducer element is made smaller than said write track width.

6. A magnetic head for writing and reading data on and from respective tracks of a recording medium, comprising a combination of first and second head modules, each of said head modules comprising a plurality of thin-film read transducer element and a plurality of thin-film write transducer elements arranged in a linear array, in which each of said head modules comprises a number N of mutually adjacent read transducer elements of said first head module positioned on one side of a center line of said tacks, where eN is an integer of value greater than one, and N mutually adjacent write transducer elements positioned on an opposite side of said center line, with read and write transducer element pairs each comprising elements of said first and second head modules being respectively aligned with corresponding ones of said tracks.

7. A magnetic head according to claim 6, in which each of said first and second head modules comprises a substrate having said transducer elements formed thereon, and in which the substrates of said first and second head modules are positioned in a mutually opposing relationship.

8. A magnetic head according o claim 7, in which said first and second head modules are mutually identical.

* * * * *